United States Patent Office 3,379,318
Patented Apr. 23, 1968

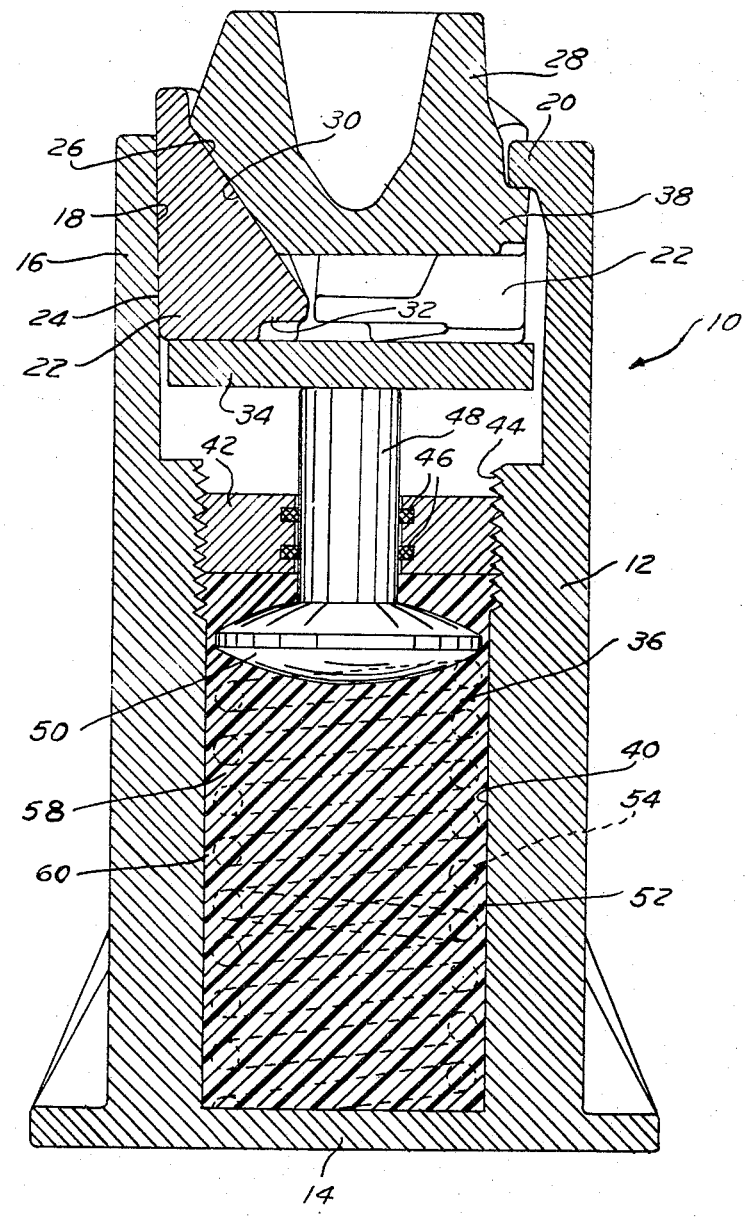

3,379,318
DRAFT GEAR
William J. Trongeau, Glen Ellyn, Ill., assignor to W. H. Miner, Inc., Chicago, Ill., a corporation of Delaware
Filed Feb. 2, 1966, Ser. No. 524,532
2 Claims. (Cl. 213—22)

ABSTRACT OF THE DISCLOSURE

A friction draft gear wherein inward movement of a series of friction shoes is opposed by the rod end of a piston having an annular peripheral orifice and being movable in a confined volume of compressible solid material having an auxiliary-return coil spring embedded therein in a manner providing additional metering of the compressible solid during a reduction of the volume thereof due to the piston rod movement.

---

My present invention relates generally to a draft gear, and the principal object thereof is the provision of a friction draft gear incorporating damped spring means.

In the draft gear of my present invention, I provide an elongated housing, friction shoes at one end of the housing, and a wedge member engaging the friction shoes and arranged for actuating the same in response to impact forces. The draft gear further includes a cylindrical chamber in the housing, a piston rod extending from the friction shoes and into the chamber, and a piston at the end of the piston rod within the chamber. The periphery of the piston is spaced from the interior cylindrical surface of the chamber whereby to define an annular orifice, and the chamber is filled with a compressible solid. As the piston rod moves into the chamber in response to impact forces received from the friction shoes, the reduction in volume of the compressible solid, and the throttling effect produced by the compressible solid being forced through the orifice, impose a damping and spring force on the piston rod and piston.

It is another object of my present invention to provide a friction draft gear assembly, as described, wherein the cylindrical chamber is in part defined by a collar which slidably guides and seals the piston rod, and which is axially adjustable within the housing for varying the initial pressure of the compressible solid in the chamber.

It is another object of my present invention to provide a friction draft gear assembly, as described, wherein a coil spring is embedded in the compressible solid intermediate one end of the chamber and the piston for providing an auxiliary spring force on the latter and the piston rod.

It is a further object of my present invention to provide a friction draft gear assembly, as described, wherein the damped spring means, together with the friction shoes and wedge member, may be incorporated in a conventional draft gear housing with only minor modifications therein.

Now in order to acquaint those skilled in the art with the manner of constructing and using draft gears in accordance with the principles of my present invention, I shall describe in connection with the accompanying drawing, a preferred embodiment of my invention.

In the drawing, the single figure is a longitudinal median sectional view of a friction draft gear incorporating the principles of my present invention.

Referring now to the drawing the friction draft gear of my present invention, which is indicated generally by the reference numeral 10, includes a housing 12, one end of which is closed by an enlarged end wall or plate 14. The draft gear 10 is adapted to be received in any standard A.A.R. draft gear pocket on a railroad car, and the end wall 14 functions as one of the followers of the device for engagement with the usual buff lugs associated with the draft gear pocket. The housing 12 is provided adjacent its open end with a friction shell section 16, of sexagonal cross section, having tapered inner surfaces 18 that converge in a direction toward the closed end of the housing 12. The open end of the housing is also provided with a series of three circumferentially spaced inwardly turned flange-like lugs 20.

Three wing-like friction shoes 22 are fitted into the friction shell section 16 in a circumferentially spaced relationship. The shoes 22 are characterized by pairs of tapered external friction surfaces 24 which are generally complementary to the friction surfaces 18 of the shell section 16. Inner tapered surfaces 26 of the shoes 22 define an outwardly opening six-sided pocket for receiving the inner end of a wedge 28. The perimeter of the outer end of the wedge 28 is generally circular in cross section and the sides thereof diverge in a direction inwardly of the housing 12. The inner end of the wedge 28 is characterized by six circumferentially arranged friction surfaces 30 which converge sharply in a direction inwardly of the housing 12 and are in continuous complementary engagement with the inner friction surfaces 26 of the shoes 22. The inner surfaces of the friction shoes 22 are suitably recessed, as at 32, to provide a seat for a follower plate 34.

Cooperating with the friction shoes 22 and the wedge 28 is damped spring means, indicated generally by the reference numeral 36. When buff or draft forces are applied to the draft gear 10, the wedge 28, and correspondingly the friction shoes 22, are moved relatively inwardly of the housing 12. The damped spring means 36 resists inward movement of the friction shoes 22 whereby to cushion, and absorb a portion of, the buff or draft forces. To retain the wedge 28 and the shoes 22 in the open end of the housing 12, despite the outward biasing action of the damped spring means 36, the wedge 28, adjacent the inner end, is provided with a series of circumferentially spaced outwardly projecting flange-like lugs 38 which are located axially inwardly of the housing lugs 20.

The damped spring means 36 includes a cylindrical chamber 40 which is defined by a cylindrical cavity formed in the housing 12 and a collar member 42. The housing 12 is internally threaded intermediate of its ends as at 44 for threadingly receiving the collar 42 whereby the latter may be axially adjusted. Extending through the collar 42, and seal members 46 mounted therein, is a piston rod 48 which is slidably guided and sealed thereby. The outer end of the piston rod 48 engages the follower plate 34, while the inner end of the piston rod is provided with a piston 50. The periphery of the piston 50 is spaced from the interior cylindrical surface of the chamber 40 to define an annular orifice therebetween. To make the damped spring means 36 operational, the chamber 40 is filled with a compressible solid or elastomer 52 such as silicone rubber. In addition, a coil spring 54 is embedded in the compressible solid 52 intermediate one end of the chamber 40 and the piston 50. The draft gear 10 is shown inactivated in the drawing.

In the operation of the draft gear 10, impact forces received by the wedge 28 cause the latter and the friction shoes 22 to move inwardly of the housing 12 whereupon a portion of the impact forces is dissipated as a result of the frictional interengagement of the surfaces 26 and 30, and 18 and 24. Additionally, inward movement of the friction shoes 22, acting on the follower plate 34, causes the piston rod 48 and the piston 50 to move inwardly of the chamber 40. During such movement, the compressible solid 52 is forced through the annular orifice surrounding the piston 50 thereby producing a throttling effect. Also, as the piston rod 48 moves inwardly of the chamber 40, the volume of the compressible solid 52 is reduced thereby increasing the pressure therein. The described throttling effect and volume-pressure change of the compressible solid serve to dissipate the energy of impact forces received by the piston rod 48. When the impact forces are removed from the wedge 28, and hence from the piston rod 48, the effective pressure of the compressible solid 52, which is unbalanced on opposite sides of the piston 50 due to the differential in areas thereof, causes the piston 50 and piston rod 48 to return to the position shown in the drawing. During the return stroke of the piston rod 48, the compressible solid flows back through the annular orifice surrounding the piston 48 to fill the space being vacated by the latter. As will be readily apparent, the compressible solid provides a damping and spring force on the piston rod and piston as the piston rod moves into the chamber.

The coil spring 54 may be incorporated in the unit to provide an auxiliary spring force on the piston and the piston rod to assist in returning the latter to their rest position. Use of the coil spring 54 may also provide an additional metering effect on the flow of the compressible solid inasmuch as the annular spaces 58 defined between adjacent coils of the spring 54 are progressively reduced in height during compression of the spring whereby same serve as decreasing orifices, thus providing a variable effect, such as an additional soft action which becomes progressively stiffer, on the dampening characteristics of the unit. Further, an additional orificing effect may be provided as a result of the generally annular spaces 60 defined between the outermost surface of each spring coil and the inner diameter of the housing 12. This latter orificing effect may be varied by either providing a slightly conical spring or changing the configuration of the housing bore, for instance, by providing same with an inward taper toward its closed end.

It also should be noted that the movable elements of the draft gear 10 are so designed and arranged that they may be incorporated in a conventional draft gear housing with only minor modifications therein. Finally, the adjustable collar 42 permits the compressible solid 52 to be preloaded as desired. In other words, the collar may be threaded axially inwardly or outwardly whereby to vary the initial pressure of the compressible solid.

Now while I have shown and described what I believe to be preferred embodiments of my present invention, it will be understood by those skilled in the art that various rearrangements and modifications may be made therein without departing from the spirit and scope of my invention.

I claim:

1. A damped spring comprising an elongated housing with a cylindrical chamber therein, a piston rod extending outwardly of said chamber for receiving impact forces, a piston at the end of said piston rod within said chamber, the periphery of said piston being spaced from the interior cylindrical surface of said chamber to define an annular orifice therebetween, a compressible solid filling said chamber for providing a damping and spring force on said piston as said piston rod moves into said chamber as a result of both metering of said solid through said annular orifice and a reduction in the volume of said solid, and a coil spring embedded in said compressible solid intermediate one end of said chamber and said piston for providing an auxiliary spring return force on the latter and said piston rod, said coil spring being spaced inwardly of the inner surface of said cylindrical chamber whereby additional annular orifices are defined not only between adjacent coils of said spring but also between said spring coils and the inner surface of said cylindrical chamber for additional metering of the flow of said compressible solid.

2. For use in a friction draft gear comprising an elongated housing having an open end and having a cylindrical cavity therein, friction shoes at the open end of the housing, and a wedge member engaging the friction shoes and arranged for actuating the same in response to impact forces, the combination of a collar in the housing defining with the cavity a cylindrical chamber, a piston rod extending outwardly of said chamber through said collar and to the friction shoes, said collar slidably guiding and sealing said piston rod, a piston at the end of said piston rod within said chamber, the periphery of said piston being spaced from the interior cylindrical surface of said chamber to define an annular orifice therebetween, a coil spring disposed in said chamber inwardly of said piston with the coils of same being spaced from the interior cylindrical surface of said chamber to define annular orifices therebetween, and a compressible solid filling said chamber with said piston and said coil spring being embedded therein for providing a damping and spring force on said piston as said piston rod moves into said chamber and reduces the volume of said compressible solid while the latter is metered through said annular piston orifice and said annular coil orifices as well as between adjacent coils of said spring.

References Cited
UNITED STATES PATENTS

| 2,554,606 | 5/1951 | Withall | 213—32 |
| 2,667,277 | 1/1954 | Mulcahy | 213—32 |
| 2,818,249 | 12/1957 | Boschi | 267—33 |
| 3,178,036 | 4/1965 | Cardwell | 213—40 |
| 3,178,037 | 4/1965 | Kendall | 213—40 |

ARTHUR L. LA POINT, *Primary Examiner.*

DRAYTON E. HOFFMAN, *Examiner.*